(12) United States Patent
Pattapu et al.

(10) Patent No.: US 10,719,523 B2
(45) Date of Patent: Jul. 21, 2020

(54) NXD QUERY MONITOR (71) Applicant: VERISIGN, INC., Reston, VA (US)

(72) Inventors: Venkata Pattapu, Ashburn, VA (US); Thomas Correia, Stone Ridge, VA (US); Jasenko Ibrahimbegovic, Lausanne (CH); Eric Ying, Oakton, VA (US); Daniel Schonfeld, Reston, VA (US)

(73) Assignee: VERISIGN, INC., Reston, VA (US)

( * ) Notice: Subject to any disclaimer, the term of this patent is extended or adjusted under 35 U.S.C. 154(b) by 660 days.

(21) Appl. No.: 15/425,789

(22) Filed: Feb. 6, 2017

(65) Prior Publication Data

US 2017/0206252 A1 Jul. 20, 2017

Related U.S. Application Data

(63) Continuation of application No. 14/042,143, filed on Sep. 30, 2013, now Pat. No. 9,563,672.

(51) Int. Cl.
*G06F 16/00* (2019.01)
*G06F 16/2458* (2019.01)
*H04L 29/12* (2006.01)

(52) U.S. Cl.
CPC ...... *G06F 16/2468* (2019.01); *H04L 61/1511* (2013.01); *H04L 61/302* (2013.01)

(58) Field of Classification Search
CPC . G06F 16/2468; H04L 61/1511; H04L 61/302
See application file for complete search history.

(56) References Cited

U.S. PATENT DOCUMENTS

| 6,338,082 | B1 | 1/2002 | Schneider |
| 6,678,717 | B1 | 1/2004 | Schneider |
| 8,312,125 | B1* | 11/2012 | Rioux ................. H04L 61/3025 709/203 |
| 8,458,161 | B2 | 6/2013 | Schneider |
| 2010/0058210 | A1 | 3/2010 | Johnson |
| 2010/0106854 | A1* | 4/2010 | Kim .................. H04L 29/12066 709/238 |
| 2010/0146001 | A1 | 6/2010 | Lee |
| 2010/0290353 | A1 | 11/2010 | Barford et al. |
| 2011/0022678 | A1 | 1/2011 | Smith et al. |
| 2011/0202793 | A1* | 8/2011 | Xu .................... H04L 29/12066 714/15 |
| 2011/0231896 | A1* | 9/2011 | Tovar ................ H04L 29/12066 726/1 |

(Continued)

OTHER PUBLICATIONS

European Office Action dated Nov. 22, 2018, European Application No. 141869743, pp. 1-8.

(Continued)

*Primary Examiner* — Jared M Bibbee
(74) *Attorney, Agent, or Firm* — MH2 Technology Law Group, LLP (57) ABSTRACT

Non-existent domain (NXD) queries may be monitored to determine if a keyword is included in NXD queries for a brand top level domain (TLD). When a predetermined number of NXD queries have been received for a brand domain that include the keyword, an action may be initiated. The action may be related to the registration of a new domain for the brand domain including the keyword.

20 Claims, 7 Drawing Sheets

(56) References Cited

U.S. PATENT DOCUMENTS

| | | | |
|---|---|---|---|
| 2011/0258237 A1* | 10/2011 | Thomas | H04L 29/12641 707/803 |
| 2011/0276716 A1* | 11/2011 | Coulson | H04L 29/12066 709/238 |
| 2012/0047153 A1* | 2/2012 | Thomas | H04L 63/1425 707/754 |
| 2012/0084281 A1* | 4/2012 | Colosi | H04L 29/12632 707/723 |
| 2012/0110165 A1* | 5/2012 | Thomas | H04L 29/12066 709/224 |
| 2012/0159623 A1* | 6/2012 | Choi | H04L 61/1511 726/22 |
| 2012/0173710 A1 | 7/2012 | Rodriguez | |
| 2012/0254398 A1* | 10/2012 | Thomas | H04L 43/06 709/224 |
| 2012/0304244 A1 | 11/2012 | Xie et al. | |
| 2013/0067115 A1* | 3/2013 | Lapanc | H04L 67/025 709/245 |
| 2013/0291101 A1* | 10/2013 | Karasaridis | G06F 21/00 726/22 |
| 2013/0332109 A1* | 12/2013 | Luiset | H04L 63/1441 702/179 |
| 2014/0283106 A1* | 9/2014 | Stahura | G06Q 10/06 726/27 |

OTHER PUBLICATIONS

Jonathan Vanasco, "An Open Letter to Name.com", Feb. 28, 2013, http://www.destructuring.net, accessed Mar. 7, 2013, pp. 1-33.

Luca Deri et al., "A Distributed DNS Traffic Monitoring System", Wireless Communications and Mobile Computing Conference (IWCMC), 2012 8th International, Aug. 27-31, 2012, pp. 30-35, http://ieeeplore.ieee.org/xpl/login.jsp?=&arnumber=6314173&url=http%3A%2F%2Fieeexploreieee.org%2Fxpls%2Fabs_all.jsp%3D6314173, accessed Mar. 7, 2013.

"Domain Name System", Wikipedia, the free encyclopedia, Retrieved from the internet: http://en.wikipedia.org/w/index.php?title=Domain_Name_System&oldid=408612755, Jan. 2011, pp. 1-15.

Extended European Search Report dated Jan. 29, 2015, European Application No. 14186974.3, pp. 1-13.

Chinese Office Action dated Nov. 2, 2018, Chinese Application No. 201410616542, pp. 1-8.

\* cited by examiner

FIG. 8

NXD QUERY MONITOR

CROSS REFERENCE TO RELATED APPLICATIONS

This application claims priority to U.S. patent application Ser. No. 14/042,143, filed Sep. 30, 2013, entitled "NXD Query Monitor", assigned or under obligation of assignment to the same entity as this application, and which is incorporated herein by reference in its entirety.

BACKGROUND

The Internet enables a user of a client computer system to identify and communicate with millions of other computer systems located around the world. A client computer system can identify each of these other computer systems using a unique numeric identifier for that computer called an "IP address." When a communication is sent from a client computer system to a destination computer system, the client computer system typically specifies the IP address of the destination computer system in order to facilitate the routing of the communication to the destination computer system. For example, when a request for a World Wide Web page ("Web page") is sent from a client computer system to a Web server computer system ("Web server") from which that Web page can be obtained, the client computer system typically includes the IP address of the Web server.

In order to make the identification of destination computer systems more mnemonic, a Domain Name System (DNS) has been developed that translates a unique alphanumeric name for a destination computer system into the IP address for that computer. Using domain names, a user attempting to communicate with this computer system could specify a destination of "comp23.example.com" rather than the particular IP address of the computer system (e.g., 198.81.209.25).

The alphanumeric name is called a "domain name." For example, the domain name for a hypothetical computer system operated by Example Corporation may be "exampleco.com". "Exampleco.com" may be considered a brand domain name as it includes the name of the company. In other examples, the brand domain name may include a string of characters, word, term, phrase, tradename, trademark, product name, service name, dba, etc., that may identify or otherwise reflect the company. The brand domain name may include, together with the TLD and a brand domain, for example, "exampleco", one or more lower-level domains for different pages within the brand website. In the example above, "shoes.exampleco.com", "shoes" may be a lower-level domain. Thus, a user seeking to access information related to shoes may understand that by entering the domain name "shoes.exampleco.com", the user is accessing information related to shoes based on the lower-level domain included in the domain name.

BRIEF DESCRIPTION OF THE DRAWINGS

The accompanying drawings, which are incorporated in and constitute a part of this specification, illustrate, together with the description, examples of the present disclosure. In the figures.

DETAILED DESCRIPTION

Companies and owners of brand names want to improve the experiences of on-line users visiting their branded websites. Their branded websites may be accessed via brand domain names that include a brand domain. The brand domain may be a top-level domain, or a domain lower than the top-level, such as a lower level domain. A brand domain name that includes the brand domain at the top level provides the opportunity for branded corporations to use their corporate name or other unique identifier (e.g. ".books") as their website's top-level identifier instead of using a more traditional .com or .biz top level domain. For example, Example Corporation may have a domain name as "shoes.exampleco", instead of the traditional second level and top level domain "exampleco.com". Users wishing to visit a branded website may input a lower-level domain within the .exampleco TLD based on a specific webpage they are trying to access. However, regardless of whether the brand domain is a TLD or a lower-level domain, if the company of the branded website did not register the domain name including the lower-level domain entered by the user, the request may result in a non-existent domain (NXD) request where the user may experience a "server not found" message. Thus, the user's on-line experience may be diminished, and thus, the user's perception of the brand may be diminished. In other implementations, upon entry of an NXD request, instead of receiving an error, the user may be redirected to a search engine web page where search results including a company's competitor's websites may be listed. This may result in not only the company's brand being diminished, but the company's competitor(s) receiving the company's business.

It may be appreciated that, in accordance with some examples as discussed herein, a domain name may be implemented as a fully qualified domain name that specifies its exact location in a tree hierarchy of the DNS. A fully qualified domain name may specify all specify all domain levels, including the TLD and the root zone.

It may further be appreciated that, in accordance with some examples as discussed herein, a domain name may be implemented as including a TLD, for example, a generic TLD, a country-code TLD, an internationalized country-code TLD, etc., and one or more lower level domains.

As discussed herein, a brand domain may be implemented in a domain name, where the brand domain may be a top-level domain, or a domain lower than the top-level domain, in other words, a lower-level domain.

As discussed herein, NXD queries may be monitored to determine if NXD queries for a brand domain include a predetermined keyword, for example in a lower-level domain. When a predetermined number (e.g., one or another number) of NXD queries include the predetermined keyword, an action may be initiated. The action may include registration of a domain name at a domain name registry or registrar, the domain name including the keyword, as a lower-level domain, and the brand domain or may include other actions, for example, sending a communication to a registrant of a brand domain name that includes the brand domain, etc.

In some examples, a predetermined keyword may include a string of characters, such as a word or phrase that may be received via a user interface, a related or proximity word or phrase of the string of characters, singular and/or plural forms of the string of characters, related or proximity word, misspellings of the string of characters, related or proximity word, etc. For example, where a string of characters, received at a user interface is "shoes", the system may generate related or proximity words "flip-flops", "sandals", "heels", etc. Thus, NXD queries may be monitored for the predetermined keywords "shoes", "flip-flops", "sandals", "heels", singular and/or plural spellings of these words, and/or misspellings of these words. These preferences may be set via a graphical user interface.

Where a large number of users input a domain name request including a brand domain and a lower-level domain that does not exist, an action may be initiated that may result in registration of the domain name including the keyword, thereby improving the user's on-line experience as it relates to the brand, and thus, improving the user's perception of the brand.

In addition to, or alternatively, a graphical user interface may be provided that enables an entity, such as a company having a brand domain name or a registrant of a brand domain name, to enter a keyword and information related to the keyword, for example, a number representing the number of NXD queries the company would like to receive before initiating an action, for example, registration of the Company's brand domain and the keyword as a domain name. Thus, when the predetermined number of NXD queries including the brand domain and the keyword have been received, an action may be initiated, for example, a domain name including the brand domain and the keyword as a lower-level domain may be registered, among other actions.

Figure 1:
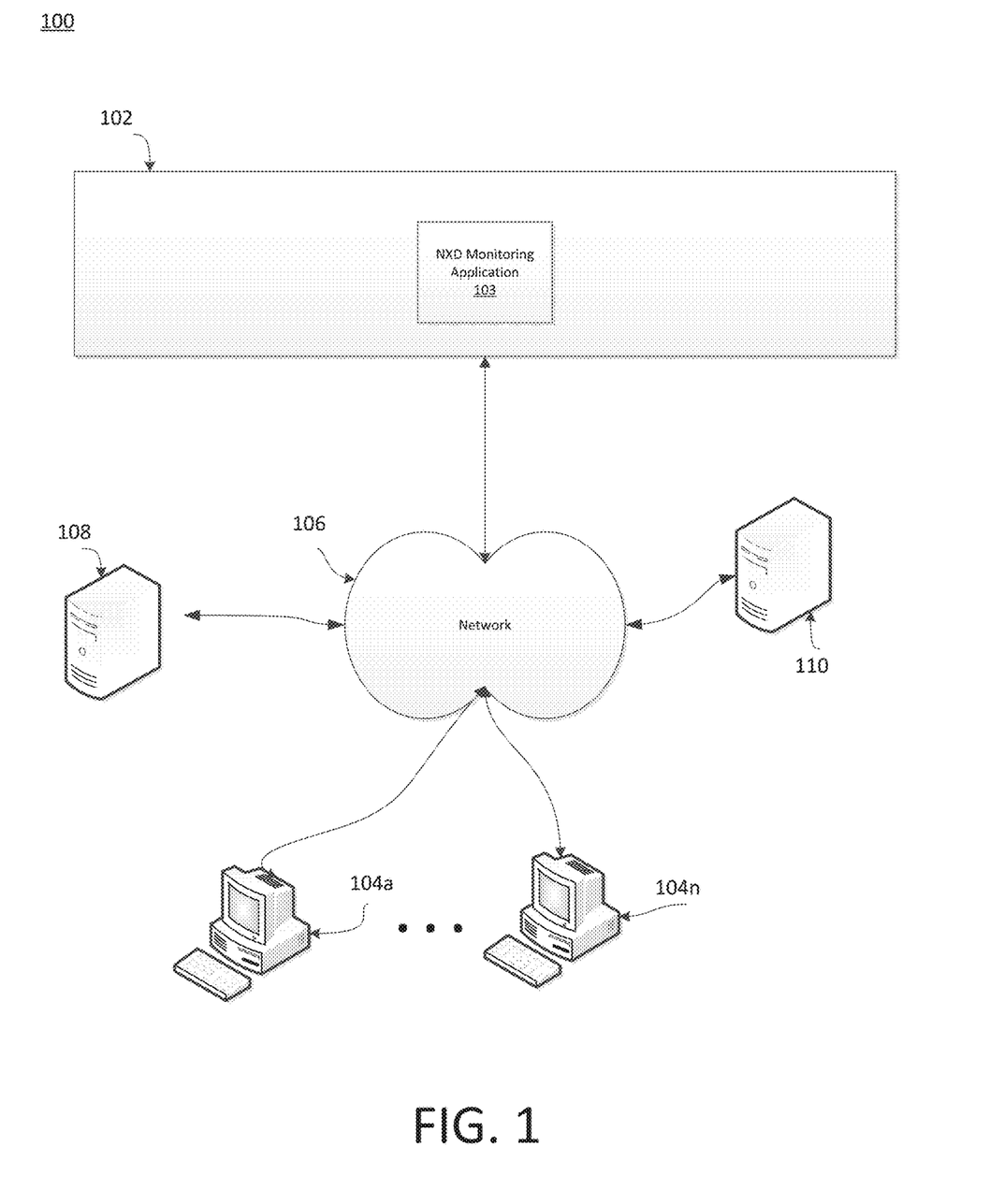
FIG. 1 is an example system environment for monitoring NXD queries and/or initiating an action, in accordance with one or more examples disclosed herein.

FIG. 1 depicts an example system environment for implementing features as discussed herein. It may be appreciated that additional elements may be included in system environment 100 and some of the elements may be removed and/or modified without departing from the spirit and scope of this disclosure.

As shown in FIG. 1, system environment 100 may include apparatus or device 102 including NXD monitoring application 103 for monitoring NXD queries. Device 102 may be communicably linked to network 106. Devices 104a through 104n may be implemented as client computing devices, administrative computing devices, etc. Devices 104a through 104n may seek to access webpages at devices not shown in FIG. 1 via uniform resource locator (URL) requests to NameServer 110. These requests may ultimately result in access to the requested webpage if the domain name was registered. However, where the URL includes a domain name that is not registered, the request results in a (NXD) request.

Device 108 may be implemented as a computing device operated by a company that hosts a brand domain website. The brand domain website may be hosted at device 108 or at another computing device (not shown) in system environment 100.

Device 102 may be implemented as a server, a mainframe computer, any combination of these components, or any other appropriate computing device, resource service, for example, cloud, etc. Device 102 may be standalone, or may be part of a subsystem, which may, in turn, be part of a larger system. It may be appreciated that, while device 102 may be described as including various components, one or more of the components may be located at other devices (not shown) within system environment 100. As shown in FIG. 1, device 102 may include a NXD monitoring application 103 for monitoring NXD queries.

Client devices 104a to 104n may be implemented as any computing device, for example, a desktop computer, laptop computer, portable computing device, etc. Client devices 104a to 104n may seek access to websites within system environment 100 by entering domain name requests.

NameServer 110 may be implemented as a computing device and may communicate with other devices within system environment 100. NameServer 110 may receive domain name requests from client devices 104a to 104n and resolve the requests where the domain names are registered. Where the domain names are not registered, the domain name requests result in an NXD query. The NXD query may be stored locally, remotely, etc. In addition, the NXD query may monitored locally or remotely, as further discussed herein.

Additionally, devices 102, 104a to 104n, 108 and 110 includes the necessary hardware and/or software needed to communicate with the network 106 via a wired and/or a wireless connection. Device 102, 104a to 104n, 108 and 110 may be embodied by server computing devices, desktop/laptop/handheld computers, wireless communication devices, personal digital assistants or any other similar devices having the necessary processing and communication capabilities. In an embodiment, the network 106 may comprise a public communication network such as the Internet or World Wide Web and/or a private communication network such as a local area network (LAN), wide area network (WAN), etc. It may be appreciated that, in some examples, device 102 and NXD monitoring application 103 may be implemented as part of NameServer 110.

One or more of devices 102, 104a to 104n, 108 and 110 may comprise one or more suitable computing devices to implement the functionality as discussed herein.

As discussed herein, devices 102, 104a to 104n, 108 and 110 include one or more processors in communication with one or more storage devices. The processor(s) may comprise a microprocessor, microcontroller, digital signal processor, co-processor or other similar devices known to those having ordinary skill in the art. The applications described herein may be implemented as either software, firmware and/or hardware applications and may be implemented as a set of computer or machine-readable instructions stored in any type of non-transitory computer-readable or machine-readable storage medium or other storage device. Some non-limiting examples of non-transitory computer-readable mediums may be embodied using any currently known media such as magnetic or optical storage media including removable media such as floppy disks, compact discs, DVDs, BLU-RAY, flash memory, hard disk drives, etc. In addition, the storage device(s) as discussed herein may comprise a combination of non-transitory, volatile or non-volatile memory such as random access memory (RAM) or read only memory (ROM). One or more storage devices has stored thereon instructions that may be executed by the one or more processors, such that the processor(s) implement the functionality described herein. In addition, or alternatively, some or all of the software-implemented functionality of the processor(s) may be implemented using firmware and/or hardware devices such as application specific integrated circuits (ASICs), programmable logic arrays, state machines, etc.

Figure 2:
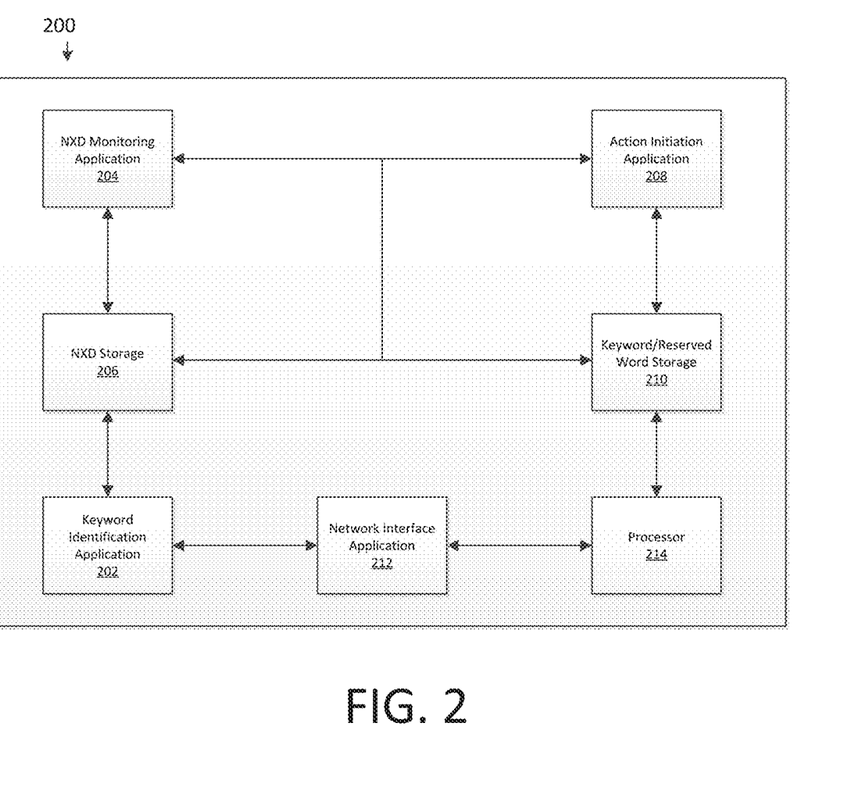
FIG. 2 is an example block diagram of components included in a device for monitoring NXD queries and/or initiating an action, in accordance with one or more examples disclosed herein.

FIG. 2 depicts an example configuration of device 200. Device 200 may be implemented, for example, as device 102 depicted in FIG. 1. As shown in FIG. 2, device 200 may include keyword identification application 202, NXD monitoring application 204, NXD storage 206, action initiation application 208, keyword/reserved word storage 210, network interface application 212 and processor 214. It may be appreciated that additional components may reside at device 200 in order to further perform the functionality as discussed herein.

Keyword identification application 202 may enable entry of keywords and information associated with the keywords. Keyword identification application 202 may provide a graphical user interface including a plurality of fields to be displayed on a display. The plurality of fields may receive values input from a user at, for example, device 108, related to one or more keywords. With respect to each keyword entered via the graphical user interface, additional fields may be provided to enable entry of one or more of the following: a brand domain name, a brand domain, a forwarding URL, a number of instances an NXD query may be received before an action may be initiated, one or more reserved words, a time period or range in which the number of instances NXD queries are received before an action may be initiated, etc. In addition, a field may be provided enabling entry of a time period and another field enabling entry of a maximum number of actions, wherein only the maximum number of actions may be initiated within the identified time period.

Data received through the graphical user interface may be stored in keyword/reserved word storage 210. This data may be accessed via NXD monitoring application 204.

NXD storage 206 may include NXD queries that are received at NameServer 110 and forwarded to device 102. NXD queries may be monitored via NXD monitoring application 204 as the requests are received from the NameServer 110, or at a later time after the NXD queries are stored in NXD storage 206. While NXD storage 206 is depicted at device 200, it may be appreciated that NXD storage 206 may reside in a different device within system environment 100, where information related to the NXD queries may be accessible by device 200.

NXD monitoring application 204 may monitor NXD queries, requests, etc., for keywords that have been identified via the graphical user interface provided by keyword identification application. In other words, in one example, as the NXD queries are received at device 102, a brand domain may be identified in the NXD query. It may be determined whether there are one or more keywords that are identified for monitoring. If there are one or more keywords identified for monitoring for the brand domain, the NXD query is analyzed to determine if any of the keywords are present in the NXD query. If a keyword is present, an indication may be made indicating as such. If a predetermined number of queries are received including the same keyword for the brand domain, an action may be initiated. If a predetermined number has not been received, monitoring may continue.

Action initiation application 208 may initiate an action if is determined that a predetermined number of NXD queries have been received that include a keyword for a brand domain. An action may include, for example, one or more of the following: registering, for example at a domain name registry or registrar, a newly created domain name including the brand name and the keyword as a lower-level domain; transmitting a communication to a registrant of the brand domain name indicating that the predetermined number of NXD queries have been received that include the keyword; transmitting a communication to a registrant of the brand domain name inviting the registrant to register a new domain name including the brand domain and the keyword as a lower-level domain, etc. In an example, the transmitted communication may include a link, for example, to a Web page, that facilitates registration of a domain name including the brand domain and the keyword as a lower-level domain.

Network interface application 212 facilitates network communication between device 102 and other devices within system environment 100.

Processor 214 may execute computer-readable instructions, stored in storage, to perform methods, processes, operations, steps or other functionality as described herein.

Figure 3:
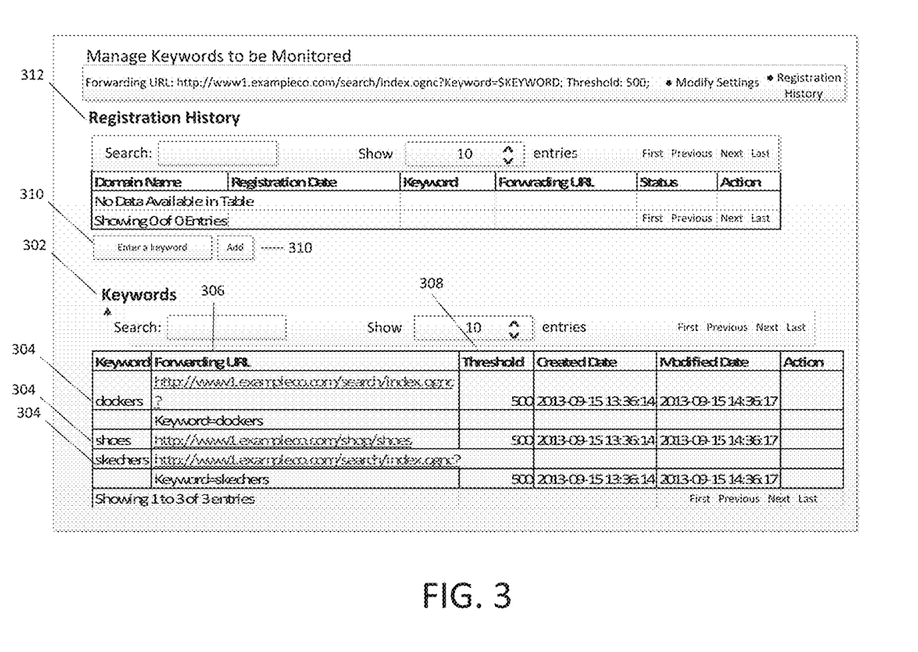
FIG. 3 is an example graphical user interface, in accordance with one or more examples disclosed herein.

FIG. 3 depicts an example graphical user interface for managing keywords that are to be monitored. The graphical user interface may be displayed on a display at, for example, device 108, operated by, for example, the registrant of the brand domain name, where device 108 may receive one or more keywords, and information associated therewith, for monitoring as discussed herein. Information entered via the graphical user interface may be transmitted to device 102 and stored in keyword/reserved word storage 210 at, for example, device 102.

As show in FIG. 3, keywords 302 may include, in one or more panes, a list of keywords that may be used for monitoring with respect to a brand domain. As shown in keywords pane 302, keyword 304 "shoes" is identified for a brand domain, namely "Exampleco". The forwarding URL 306 corresponding to keyword 304 "shoes" is identified as http://www1.exampleco.com/shop/shoes. The threshold 308 corresponding to keyword 304 "shoes" is identified as 500. In various embodiments, threshold 308 is the number of NXD queries including the keyword that are to be received before an action is initiated. Thus for the example shown, NXD queries will be monitored to count those requests including brand domain "exampleco" and including the keyword "shoes". When 500 requests including this brand domain and this keyword are received, a specified action may be taken, such as registering "shoes.exampleco" and/or "shoes.exampleco.com" as a domain name. The forwarding URL, received via the graphical user interface, corresponding to the keyword "shoes" may be mapped to the newly registered domain name. Thus, when a user enters the newly registered domain name, the user may be taken to the website at the forwarding URL. As the user is accessing the newly registered domain name, the user will not receive a "server not found" error.

It may be appreciated, according to some examples, that the keyword may be a part of a larger string of characters of a lower level domain. If the number of NXD queries including the larger string of characters for the lower level domain exceeded the predetermined threshold, then a new domain name, including the larger string as the lower level domain together with the brand domain and a top-level domain, may be registered for the brand domain name. For example, if the predefined keyword is "shoes", and the NXD query includes "shoesby.exampleco.com", the NXD query would be considered as including the keyword. If the number of NXD queries including "shoesby" in the lower level domain exceeded the predetermined threshold, then an action may be taken as discussed herein, for example, the registration of a new domain name such as "shoesby.exampleco.com".

A new keyword may be entered at field 310 for monitoring by the NXD monitoring application 204. Upon the entry of a new keyword, it may be appreciated that additional fields may be presented in the graphical user interface to receive additional information related to the keyword, including the threshold 308, forwarding URL 306, a time period, etc. Information received via the fields in the graphical user interface may be stored in keyword/reserved word storage 210 and utilized during the monitoring of the NXD queries.

Registration history 312 may be implemented as a pane that lists domain names that were registered based on the receipt of the threshold (predetermined) number of NXD queries that included the brand domain and a keyword that was identified via the keyword identification application 202.

It may be appreciated that the graphical user interface of FIG. 3 may include additional information and fields for entry of additional information related to the entry of keywords for monitoring. For example, time periods may be specified identifying a time period during which the threshold number of NXD queries must be received before an action may be initiated. As another example, the type of action may be specified, for example, whether a domain name should be registered, whether a communication should be transmitted to a registrant of the brand domain name, etc. As another example, one or more reserved words may be entered via the graphical user interface. Reserved words may be used to check against registration or domain names that include words the brand domain name registrant does not wish to register. Reserved words may be, for example, derogatory words, or any other words that may be designated. It may be appreciated that reserved words may, in addition, or alternatively, be entered at device 102.

According to some examples, a "kill switch" functionality may be incorporated that may stop all writable transactions (for example, stop the ability to register domain names, etc.). In other words, the kill switch may suspend the functionality to automatically register domain names but may not impact the NXD monitoring or alert functionality. Therefore, a user logged into the tool may utilize interactive elements in the user interface, for example, an actuatable button, pull down menu, etc., to enable the kill switch to suspend future registrations and not incur more fees, but may continue to have NXD traffic monitored and provide alerts when a domain name containing a specified keyword exceeded a predetermined threshold. This functionality may be beneficial if there were an increased number of non-existent domain name queries monitored, for example, resulting from a bad actor or a misconfigured server. The kill switch may, in some examples, also be used to reactivate functionality after it had previously been used to stop writable transactions from occurring. In some examples, if the kill switch is turned back on, domain names that had exceeded the threshold during the prior period may not be queued or registered automatically, and new domain names may only be registered if they exceeded the threshold after reactivation. In another example, with respect to one or more keywords, a value may be displayed indicating a current value of how many NXD queries were received that included the keyword, a current value of how many NXD queries include the keyword for the current period of time, a maximum number of NXD queries (regardless of the time period) of how many NXD queries included the keyword, etc.

Figure 4:
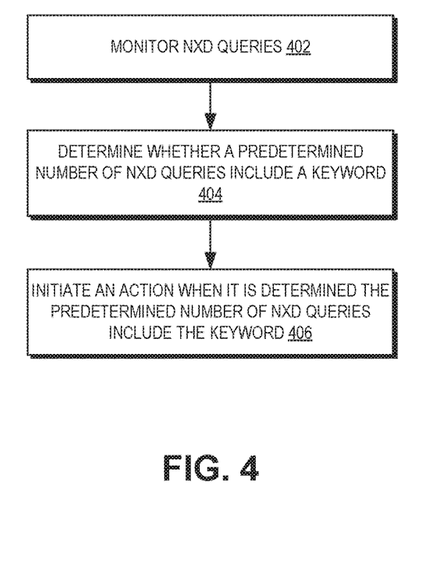
FIG. 4 is an example flow diagram of a method for initiating an action, in accordance with one or more examples disclosed herein.

FIG. 4 depicts an example flow diagram of a process for monitoring NXD queries. The process depicted in FIG. 4 may be performed, for example, by device 102, device 200, etc. As shown in FIG. 4, NXD queries are monitored (402). NXD queries for a brand domain may be monitored as the NXD queries are received by or from, for example, a NameServer 110 or from other devices within system environment 100. Alternatively, monitoring may be performed by accessing a plurality of NXD queries stored in NXD storage 206.

A determination may be made whether a predetermined number of NXD queries for a brand domain include a keyword (404). As noted above, one or more keywords may be entered via keyword identification application 202 and stored in keyword/reserved word storage 210. As the NXD queries are monitored, they are checked to see whether they include a keyword for a particular brand domain. As NXD queries are determined to include a keyword for a brand domain, an indication may be made, for example, a counter associated with the keyword may be incremented. A determination may be made whether the number of NXD queries received including the keyword with respect to the brand domain has reached a predetermined threshold value. For example, the counter value counting the number of NXD queries including the keyword for the brand domain may be compared with the threshold value, for example, entered via a graphical user interface, to determine if the threshold value has been met.

An action may be initiated when it is determined that the predetermined number of NXD queries include the keyword with respect to the brand domain (406). For example, the action may be designated by the registrant of the brand domain name, may be set by an administrator of device 102, may be set by default, etc. The action may include registration of a domain name including the brand domain and the keyword, where the keyword may be identified as a lower-level domain and associated with the brand domain. The associated lower-level domain and brand domain may be registered as a domain name such that the registrant of the brand domain name is registered as the registrant of the associated lower-level domain and brand domain.

Alternatively, or in addition, the action may include transmitting a communication to a registrant of the brand domain name identifying the lower-level domain. The communication may further indicate that the predetermined threshold number of NXD queries including the keyword for the brand domain has been reached.

In another example, the brand domain name registrant may designate, via the graphical user interface, the action to be a two-step process, the first step including transmitting a communication to the registrant indicating the first threshold has been met. The NXD queries may be further monitored to determine if a higher threshold value has been met. Once the higher threshold value has been met, the second step may include registering a domain name including the keyword as a lower-level domain and the brand domain. In this example, both the first threshold and the higher threshold value may be entered by a registrant via the graphical user interface, entered by an administrator at device 200, set by default, etc.

In another example, prior to registration of the domain name including the keyword as the lower-level domain and the brand domain, an additional check may be made to determine if the keyword is a reserved word. An example of a reserved word may be a derogatory word, or any other word designated by the registrant of the brand domain name, an administrator of device 102 or 200, etc. If the keyword is a reserved word, an alternative action may be taken. For example, a communication may be transmitted to the registrant of the brand domain name indicating that the predetermined number of NXD queries were received including the reserved word, the domain name including the reserved word and the brand domain may be barred from being registered, etc.

In another example, a determination may be made as to whether a maximum number of domain name registrations have been made by the processes discussed herein. This determination may be made with respect a particular time period, for example, a period of hours, days, weeks, months, etc. The maximum number of registrations and the time period may be entered via the graphical user interface by keyword identification application 202. In this example, a number of new registrations for the brand domain may be determined for a particular time period. When initiating the action, the keyword as the lower-level domain may be associated with the brand domain to create a new domain name and registered only when the determined number of new registrations for the brand domain during the predetermined time period is less than a maximum number of new registrations for the brand domain. This may protect the brand domain name registrant from malicious users, bots, etc., which may generate large numbers of NXD queries including keywords, resulting in a large number of registrations in a defined period of time.

In another example, initiation of an action may include initiating further analysis of the NXD queries prior to registration. For example, once it is determined that a predetermined number of NXD queries include a keyword, calculation of a variance from the normal volume range of NXD queries in the time period may occur. In another example, calculation of the deviation from the mean number of NXD queries in the time period, standard deviation, logarithmic distance, etc., may occur. Further, the normal volume range may be adjusted based on calendar events, including hour of the day, day of the week, month of the year, holiday or other calendar events. By utilizing this statistical analysis, the system may normalize traffic and compare NXD traffic with the normalized traffic. If there is a significant increase in the traffic, as predefined as a threshold by a user, then the keyword, as a lower level domain, combined with the brand domain, may be registered as a domain name.

Figure 5:
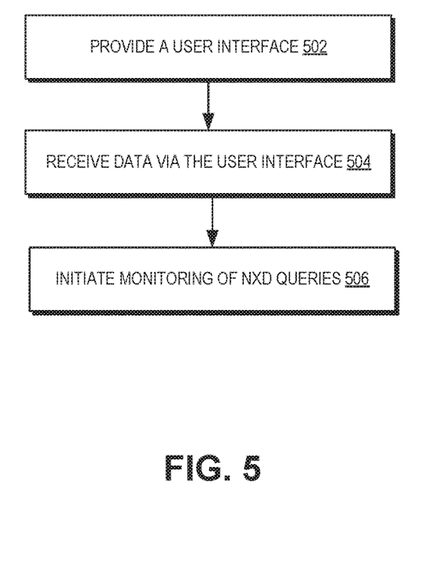
FIG. 5 is an example flow diagram of a method for initiating monitoring of NXD queries, in accordance with one or more examples as discussed herein.

FIG. 5 depicts an example flow diagram of a process for initiating monitoring of NXD queries. The process depicted in FIG. 5 may be performed, for example, by device 102, device 200, etc. As shown in FIG. 5, a graphical user interface may be provided (502). The graphical user interface may be provided to device 108 and displayed on a display at device 108. The graphical user interface may include one or more fields that may be configured to receive information as noted above, for example, a keyword, a forwarding URL, a threshold value, etc. The graphical user interface may further include one or more additional panes that display information related to historical registrations, keywords and information associated with the keywords that have already been entered, etc., as noted above.

A keyword may be received via the field in the graphical user interface, a forwarding URL may be received via the forwarding URL field and a threshold value may be received via the threshold value field (504). Additional information may be received via the graphical user interface related to the brand domain, the keyword, maximum number of registrations, etc., as noted herein.

Monitoring of NXD queries including the brand domain and the keyword received via the graphical user interface may be initiated (506).

An action may be initiated when a predetermined number of NXD queries including the keyword exceed the threshold value received via the graphical user interface. For example, the action may be designated by the registrant of the brand domain name, may be set by an administrator of device 102, may be set by default, etc. The action may include registration of a domain name including the brand domain and the keyword, where the keyword may be identified as a lower-level domain and associated with the brand domain to create a new domain name. The new domain name may be registered such that the registrant of the brand domain name is registered as the registrant of the new domain name.

Alternatively, or in addition, the action may include transmitting a communication to a registrant of the brand domain name identifying the lower-level domain. The communication may further indicate that the predetermined threshold number of NXD queries including the keyword for the brand domain have been reached. In one example, the communication may include a link to facilitate registration of a new domain name including the keyword and the brand domain.

In another example, the brand domain name registrant may designate, via the graphical user interface, the action to be a two-step process, the first step including transmitting a communication to the registrant indicating the first threshold has been met. The NXD queries may be further monitored to determine if a higher threshold value has been met. Once the higher threshold value has been met, the second step may include registering a domain name including the keyword as the lower-level domain and the brand domain.

In another example, prior to registration of the domain name including the keyword as the lower-level domain and the brand domain, an additional check may be made to determine if the keyword is a reserved word. An example of a reserved word may be a derogatory word, or any other word designated by the registrant of the brand domain name, an administrator of device 102 or 200, etc. If the keyword is a reserved word, an alternative action may be taken. For example, a communication may be transmitted to the registrant of the brand domain name indicating that a number of NXD queries were received including the reserved word, the domain name including the reserved word and the brand domain may not be registered, etc.

In another example, a determination may be made as to whether a maximum number of domain name registrations have been made by the processes discussed herein. This determination may be made with respect a particular time period, for example, a period of hours, days, weeks, months, etc. The maximum number of registrations and the time period may be entered via the graphical user interface by keyword identification application 202. In this example, a number of new registrations for the brand domain may be determined for a particular time period. When initiating the action, the keyword as the lower-level domain may be associated with the brand domain to create a new domain name and registered only when the determined number of new registrations for the brand domain during the predetermined time period is less than a maximum number of new registrations for the brand domain. This may protect the brand domain name registrant from malicious users, bots, etc., from generating large amounts of NXD queries including keywords resulting in a large amount of registrations in a defined period of time.

In another example, initiation of an action may include initiating further analysis of the NXD queries prior to registration. For example, once it is determined that a predetermined number of NXD queries include the keyword, calculation of a variance from the normal volume range in the time period may occur. In another example, calculation of the deviation from the mean, standard deviation, logarithmic distance, etc., may occur. Further, the normal volume range may be adjusted based on calendar events, including hour of the day, day of the week, month of the year, holiday or other calendar events.

Figure 6:
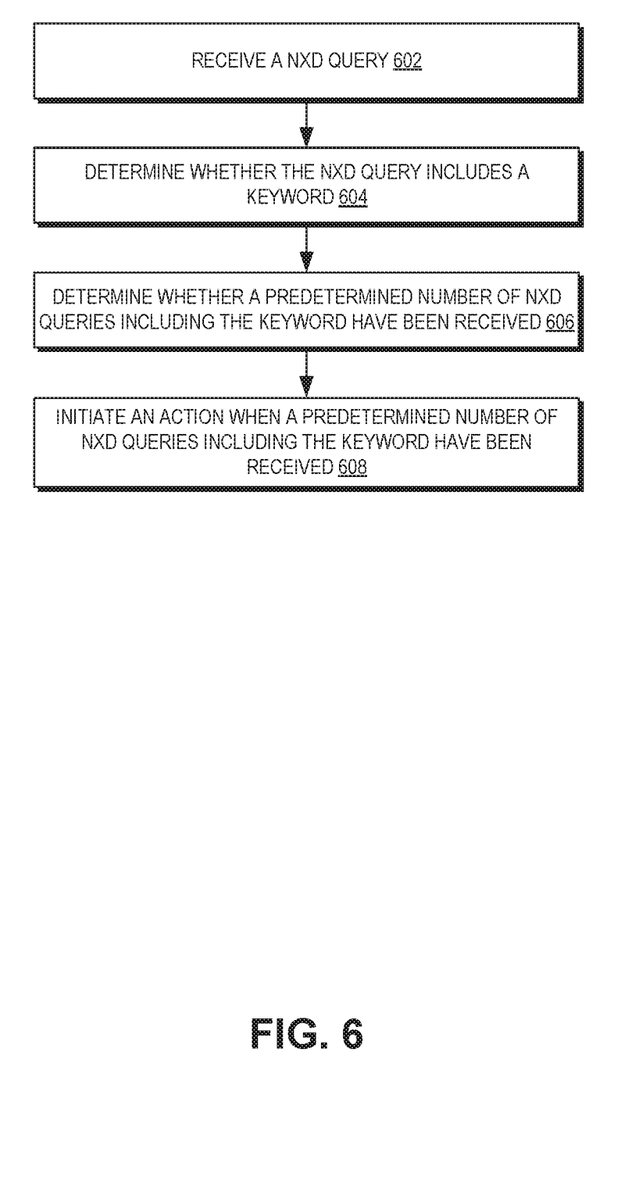
FIG. 6 is an example flow diagram of a method for initiating an action, in accordance with one or more examples as discussed herein.

FIG. 6 depicts an example flow diagram of initiating an action. The process shown in FIG. 6 may be performed, for example, by device 102, device 200, etc. As shown in FIG. 6, an NXD query may be received (602). The NXD query may be received, for example, from a client device 104a through 104n, from NameServer 110, etc.

A determination may be made whether the received NXD query includes a keyword (604). For example, a brand domain may be determined, for example, parsed, extracted, etc., from the received NXD query. Keyword/reserved word storage 210 may be accessed to determine if there are any keywords associated with the brand domain determined from the NXD query. If there are one or more keywords associated with the determined brand domain, a determination is made whether keyword is included in the NXD query. If the NXD query includes the keyword, an indication may be made that an NXD query was received matching the keyword. This may be done, for example, via one or more counters stored in, for example, keyword/reserved word storage. A counter associated with the keyword found in the NXD query may be incremented indicating the NXD query included the keyword.

Upon determining that the NXD query includes the keyword, a determination may be made whether a predetermined number of received NXD queries include the keyword (606). For example, the current value of the counter counting the number of received NXD queries that include the keyword may be compared to the threshold value received, for example, via the graphical user interface, set by default, etc.

Upon determining that the predetermined number of received NXD queries include the keyword, for example, the current value of the counter counting the number of received NXD queries that include the keyword matches or exceeds the threshold value, an action may be initiated (608).

For example, the action may be designated by the registrant of the brand domain name, may be set by an administrator of device 102, may be set by default, etc. The action may include registration of a newly created domain name including the brand domain and the keyword, where the keyword may be identified as a lower-level domain and associated with the brand domain. The newly created domain name, including the keyword as the lower-level domain and the brand domain may be registered as a domain name where the registrant of the brand domain name is registered as the registrant of newly created domain name. The forwarding URL received via the graphical user interface may be mapped to the newly created domain name.

Alternatively, or in addition, the action may include transmitting a communication to a registrant of the brand domain name identifying the lower-level domain. The communication may further indicate that the predetermined number of NXD queries including the keyword for the brand domain have been reached.

In another example, the brand domain name registrant may designate, via the graphical user interface, the action to be a two-step process, the first step including transmitting a communication to the registrant indicating the first threshold has been met. The NXD queries may be further monitored to determine if a higher threshold value has been met. Once the higher threshold value has been met, the second step may include registering a domain name including the keyword as the lower-level domain and the brand domain.

In another example, prior to registration of the domain name including the keyword as the lower-level domain and the brand domain, an additional check may be made to determine if the keyword is a reserved word. An example of a reserved word may be a derogatory word, or any other word designated by the registrant of the brand domain name, an administrator of device 102 or 200, etc. If the keyword is a reserved word, an alternative action may be taken. For example, a communication may be transmitted to the registrant of the brand domain name indicating that a number of NXD queries were received including the reserved word, the domain name including the reserved word and the brand domain may not be registered, etc.

In another example, a determination may be made as to whether a maximum number of domain name registrations have been made by the processes discussed herein. This determination may be made with respect a particular time period, for example, a period of hours, days, weeks, months, etc. The maximum number of registrations and the time period may be entered via the graphical user interface by keyword identification application. In this example, a number of new registrations for the brand domain may be determined for a particular time period. When initiating the action, the keyword may be used as the lower-level domain and associated with the brand domain to create a new domain name and registered only when the determined number of new registrations for the brand domain during the predetermined time period is less than a maximum number of new registrations for the brand domain. This may protect the brand domain name registrant from malicious users, bots, etc., from generating large amounts of NXD queries including keywords resulting in a large amount of registrations in a defined period of time.

In another example, initiation of an action may include initiating further analysis of the NXD queries prior to registration. For example, once it is determined that a predetermined number of NXD queries include the keyword, calculation of a variance from the normal volume range in the time period may occur. In another example, calculation of the deviation from the mean, standard deviation, logarithmic distance, etc., may occur. Further, the normal volume range may be adjusted based on calendar events, including hour of the day, day of the week, month of the year, holiday or other calendar events.

In some examples, during the monitoring process, where the keyword is a portion of a larger string of a lower level domain, the entire lower level domain may be stored in association with an indication that an NXD query was received. When the number of NXD queries including the larger string has reached the predetermined threshold, an action may be taken.

Figure 7:
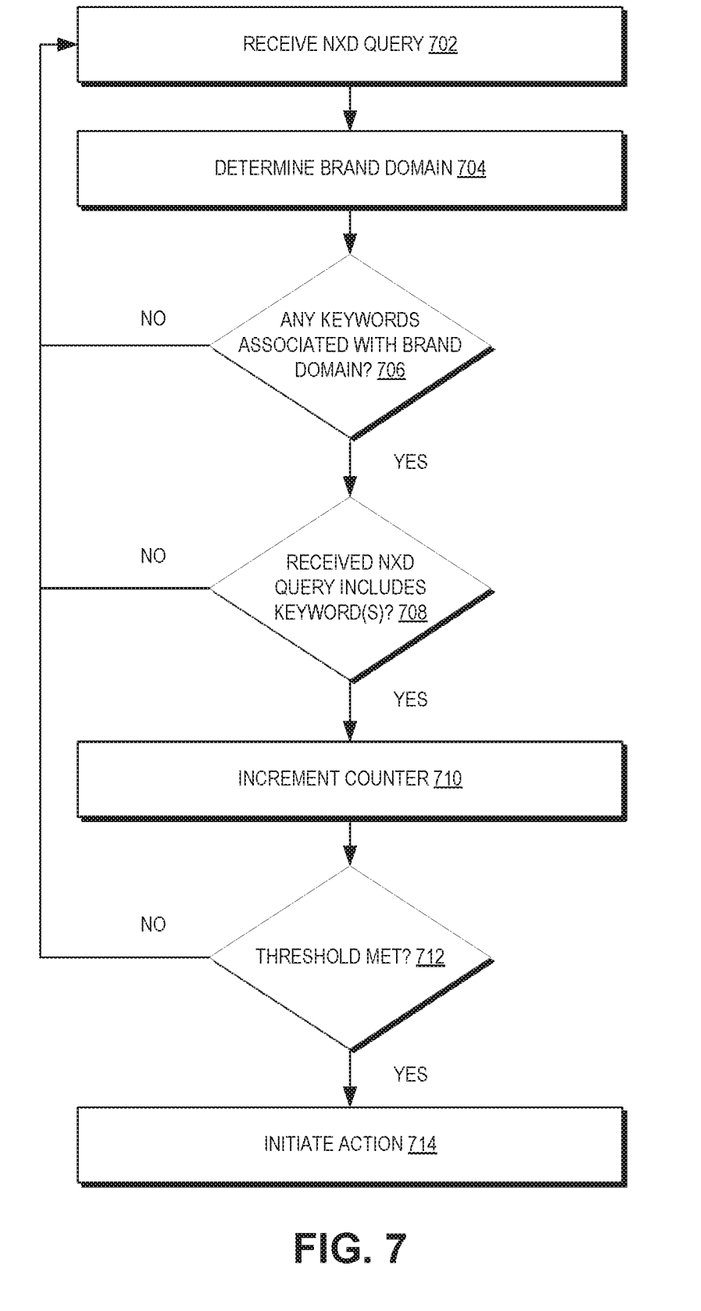
FIG. 7 is an example flow diagram of a method for initiating an action, in accordance with one or more examples as discussed herein.

FIG. 7 depicts an example flow diagram of a process for initiating an action. The process depicted in FIG. 7 may be performed, for example, by device 102, device 200, etc. In the example in FIG. 7, assume the brand domain is ".example". Further assume a registrant has entered a keyword "shoes", "http://www1.example.com/shop/shoes" as the forwarding URL, "500" as a threshold value, and an indication that a domain name including the brand domain and the keyword should be registered when the threshold is met. No time period has been identified within which the 500 NXD queries need to be received. A counter is associated with the keyword "shoes" and initialized to "0". Thus, these values may be stored in keyword/reserved word storage 210 and associated with ".example" as the brand domain.

As shown in FIG. 7, an NXD query may be received (702). The NXD query may be received, for example, from device 104*a* through 104*n*, NameServer 110, etc. In this example, the NXD query may be "www.shoes.example.com".

The NXD monitoring application may determine, for example, by parsing, extracting, etc., the brand domain included in the NXD query (704). In this example, ".example" may be determined.

Monitoring application may access keyword/reserved word storage 210 to determine if there are any stored keywords associated with the brand domain, namely example.com (706). In this example, "shoes" is stored in association with the brand domain, ".example".

Processing proceeds to block 708 to determine if the received NXD query includes the identified keyword "shoes". As the received NXD query "www.shoes.example.com" includes the keyword, processing proceeds to block 710.

A counter associated with the keyword "shoes" is incremented to "1" (710).

A determination is made as to whether the threshold value of "500" has been met (712). As the current value of the counter, namely "1", does not equal the threshold value of "500", processing proceeds to block 702 to process the next received NXD query.

Once 500 queries are received that have the brand domain ".example", and further include the keyword "shoes", then processing may proceed to block 714 where an action may be initiated. Based on the registrant's entry via the graphical user interface, the domain name "shoes.example" is registered with a domain name registry. Alternatively, "shoes.example.com" may be registered with a domain name registry.

Figure 8:
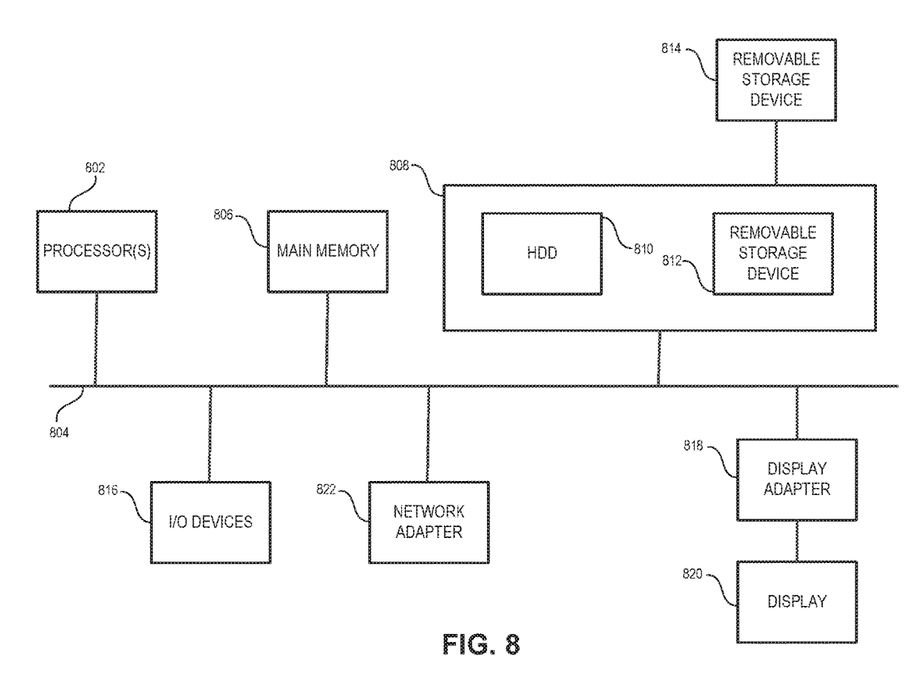
FIG. 8 is an example computer system or apparatus that may be used as a platform for executing the functionality discussed herein.

FIG. 8 illustrates a block diagram of a computing apparatus 800, such as the device 200 depicted in FIG. 2, according to an example. In this respect, the computing apparatus 800 may be used as a platform for executing one or more of the functions described hereinabove.

The computing apparatus 800 includes one or more processors 802, such as the processor(s) 214. The processor(s) 802 may be used to execute some or all of the steps, operations, or functions described in the methods and processes depicted in FIGS. 4-7. Commands and data from the processor(s) 802 are communicated over a communication bus 804. The computing apparatus 800 also includes a main memory 806, such as a random access memory (RAM), where the program code for the processor(s) 802, may be executed during runtime, and a secondary memory 808. The secondary memory 808 may include, for example, one or more hard disk drives 810 and/or a removable storage drive 812, representing a floppy diskette drive, a magnetic tape drive, a compact disk drive, etc., where a copy of the program code for the methods depicted in FIGS. 4-7 may be stored.

The removable storage drive 810 may read from and/or writes to a removable storage unit 814 in a well-known manner. Input and output devices 816 may include a keyboard, a mouse, a display, etc. A display adaptor 818 may interface with the communication bus 804 and the display 820 and may receive display data from the processor(s) 802 and convert the display data into display commands for the display 820. In addition, the processor(s) 802 may communicate over a network, for instance, network 106, the Internet, LAN, etc., through a network adaptor 822.

What is claimed is:

1. A computer-implemented method for processing queries to a domain name system, comprising:
    monitoring non-existent domain (NXD) queries that include a first domain;
    determining, using a computing apparatus, that a predetermined number of the NXD queries include a second domain that comprises a predetermined keyword, wherein the second domain is not a top-level domain; and
    initiating a domain name registration action corresponding to a domain name that includes the predetermined keyword and the first domain, in response to the determining that the predetermined number of the NXD queries include the second domain.

2. The computer-implemented method of claim 1, wherein the first domain is a top-level domain.

3. The computer-implemented method of claim 1, wherein the first domain is a not a top-level lower level domain.

4. The computer-implemented method of claim 1, wherein determining that the predetermined number of the NXD queries include the second domain comprises determining that the predetermined number of the NXD queries include the second domain during a predefined time period.

5. The computer-implemented method of claim 4, further comprising determining a normalized traffic volume during the predefined time period, and wherein initiating the domain name registration action is further in response to determining that a number of the NXD queries is greater than the normalized traffic volume by a predetermined threshold.

6. The computer-implemented method of claim 1, wherein initiating the domain name registration action comprises:
    using the predetermined keyword as a non-top-level domain in combination with the first domain to create the domain name; and
    registering the domain name.

7. The computer-implemented method of claim 1, wherein initiating the domain name registration action comprises transmitting a communication to a registrant for domain names comprising the first domain, wherein the communication identifies the second domain that comprises the predetermined keyword.

8. A computer-implemented method for processing queries to a domain name system, comprising:
    monitoring non-existent domain (NXD) queries that include a first domain;
    determining, using a computing apparatus, that a predetermined number of the NXD queries include a second domain that comprises a predetermined keyword, wherein the second domain is not a top-level domain;
    determining that the predetermined keyword is a reserved word; and
    barring a domain name registration action corresponding to a domain name that includes the predetermined keyword and the first domain in response to the determining that the predetermined number of the NXD queries include the second domain and the determining that the predetermined keyword is a reserved word.

9. The computer-implemented method of claim 8, wherein the first domain is a top-level domain.

10. The computer-implemented method of claim 8, wherein the first domain is not a top-level domain.

11. The computer-implemented method of claim 8, wherein determining that the predetermined number of the NXD queries include the second domain comprises determining that the predetermined number of the NXD queries include the second domain during a predefined time period.

12. The computer-implemented method of claim 11, further comprising determining a normalized traffic volume during the predefined time period, wherein barring the domain name registration action is further in response to determining that a number of the NXD queries is greater than the normalized traffic volume by a predetermined threshold.

13. The computer-implemented method of claim 8, wherein barring the domain name registration action comprises:
using the predetermined keyword as a non-top-level domain in combination with the first domain to create the domain name; and
barring a registration of the domain name.

14. The computer-implemented method of claim 8, further comprising transmitting a communication to a registrant for domain names comprising the first domain, wherein the communication identifies the second domain that comprises the predetermined keyword.

15. A system for processing queries to a domain name system, the system comprising:
one or more processors; and
one or more computer-readable media, wherein the one or more computer-readable media contain instructions that, when executed by the one or more processors, cause the one or more processors to perform operations comprising
monitoring non-existent domain (NXD) queries that include a first domain;
determining, using a computing apparatus, that a predetermined number of the NXD queries include a second domain that comprises a predetermined keyword; and
initiating a domain name registration action corresponding to a domain name that includes the predetermined keyword and the first domain, in response to the determining that the predetermined number of the NXD queries include the second domain.

16. The system of claim 15, wherein the first domain is a top-level domain.

17. The system of claim 15, wherein the first domain is not a top-level domain.

18. The system of claim 15, wherein determining that the predetermined number of the NXD queries include the second domain comprises determining that the predetermined number of the NXD queries include the second domain during a predefined time period.

19. The system of claim 18, the operations further comprising determining a normalized traffic volume during the predefined time period, and wherein initiating the domain name registration action is further in response to determining that a number of the NXD queries is greater than the normalized traffic volume by a predetermined threshold.

20. The system of claim 15, wherein initiating the domain name registration action comprises:
using the predetermined keyword as a non-top-level domain in combination with the first domain to create the domain name; and
registering the domain name.

* * * * *

UNITED STATES PATENT AND TRADEMARK OFFICE
CERTIFICATE OF CORRECTION

PATENT NO. : 10,719,523 B2
APPLICATION NO. : 15/425789
DATED : July 21, 2020
INVENTOR(S) : Venkata Pattapu et al.

It is certified that error appears in the above-identified patent and that said Letters Patent is hereby corrected as shown below:

In the Claims

In Claim 3:
At Column 14, Line 27, "lower level" should be deleted.

Signed and Sealed this
Tenth Day of November, 2020

Andrei Iancu
*Director of the United States Patent and Trademark Office*